US012791152B2

(12) United States Patent
Ruf

(10) Patent No.: US 12,791,152 B2
(45) Date of Patent: Nov. 10, 2026

(54) PRESSURE VESSEL ASSEMBLY AND MOTOR VEHICLE

(71) Applicant: Bayerische Motoren Werke Aktiengesellschaft, Munich (DE)

(72) Inventor: Michael Ruf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 272 days.

(21) Appl. No.: 18/263,018

(22) PCT Filed: Feb. 7, 2022

(86) PCT No.: PCT/EP2022/052806
§ 371 (c)(1),
(2) Date: Jul. 26, 2023

(87) PCT Pub. No.: WO2022/167629
PCT Pub. Date: Aug. 11, 2022

(65) Prior Publication Data

US 2024/0084974 A1 Mar. 14, 2024

(30) Foreign Application Priority Data

Feb. 5, 2021 (DE) ..................... 10 2021 102 694.6

(51) Int. Cl.
*F17C 13/08* (2006.01)
*F17C 13/12* (2006.01)

(52) U.S. Cl.
CPC .......... *F17C 13/084* (2013.01); *F17C 13/123* (2013.01); *F17C 2201/0109* (2013.01);
(Continued)

(58) Field of Classification Search
CPC .. F17C 13/084; F17C 13/12; F17C 2221/012; F17C 2221/033; F17C 2223/036;
(Continued)

(56) References Cited

U.S. PATENT DOCUMENTS 8,465,057 B2 * 6/2013 Dandalides ............ B60G 11/04 280/834
10,525,824 B2 1/2020 Kataoka et al.
(Continued)

FOREIGN PATENT DOCUMENTS

CN 109383275 A 2/2019
DE 10 2011 051 437 A1 1/2013
(Continued)

OTHER PUBLICATIONS

PCT/EP2022/052806, International Search Report dated May 30, 2022 (Two (2) pages).
(Continued)

*Primary Examiner* — Keith M Raymond
(74) *Attorney, Agent, or Firm* — Crowell & Moring LLP

(57) ABSTRACT

A pressure vessel assembly includes a plurality of pressure vessels which are disposed so as to be mutually parallel, one or a plurality of fixed bearings, and one or a plurality of floating bearings. Each pressure vessel at one longitudinal end is fastened to a fixed bearing and at an opposite longitudinal end is fastened to a floating bearing. The floating bearings define an initial intrusion space and, by displacing the pressure vessels along the floating bearings, a dynamic intrusion space opposite the floating bearings is defined.

14 Claims, 4 Drawing Sheets

(52) U.S. Cl.
CPC .................... *F17C 2201/056* (2013.01); *F17C 2205/0142* (2013.01); *F17C 2205/0146* (2013.01); *F17C 2205/0192* (2013.01); *F17C 2221/012* (2013.01); *F17C 2221/033* (2013.01); *F17C 2223/0123* (2013.01); *F17C 2223/036* (2013.01); *F17C 2270/0178* (2013.01); *F17C 2270/0184* (2013.01)

(58) Field of Classification Search
CPC ............. F17C 2270/0178; Y02E 60/32; Y02E 60/50; B60K 2015/03118; B60K 15/08
See application file for complete search history.

(56) References Cited

U.S. PATENT DOCUMENTS

| | | | | |
|---|---|---|---|---|
| 2016/0053941 | A1* | 2/2016 | Rebernik | F17C 3/08 206/583 |
| 2016/0272104 | A1* | 9/2016 | Stahl | B60K 15/07 |
| 2018/0283610 | A1 | 10/2018 | Wexler et al. | |
| 2019/0047409 | A1 | 2/2019 | Kataoka et al. | |
| 2019/0263450 | A1 | 8/2019 | Inoue et al. | |
| 2020/0180428 | A1* | 6/2020 | Sawai | F17C 1/00 |
| 2023/0332750 | A1* | 10/2023 | Bartl | F17C 13/123 |

FOREIGN PATENT DOCUMENTS

| | | | | |
|---|---|---|---|---|
| DE | 10 2013 014 958 | A1 | 3/2015 | |
| DE | 10 2013 018 779 | A1 | 5/2015 | |
| DE | 10 2018 116 090 | A1 | 2/2019 | |
| DE | 10 2017 011 492 | A1 | 6/2019 | |
| DE | 102019202895 | A1 * | 9/2020 | F17C 1/00 |
| EP | 3 441 253 | A1 | 2/2019 | |
| JP | 2019-147500 | A | 9/2019 | |
| WO | WO 2018/183764 | A1 | 10/2018 | |

OTHER PUBLICATIONS

German Search Report issued in German application No. 10 2021 102 694.6 dated Sep. 13, 2021, with Statement of Relevancy (Seven (7) pages).

Chinese-language Office Action issued in Chinese Application No. 202280013159.X dated May 23, 2025 with English translation (12 pages).

* cited by examiner

PRESSURE VESSEL ASSEMBLY AND MOTOR VEHICLE

BACKGROUND AND SUMMARY OF THE INVENTION

The technology disclosed herein relates to a pressure vessel assembly and to a motor vehicle having such a pressure vessel assembly.

Pressure vessel assemblies typically have a plurality of pressure vessels which can be used for storing gaseous fuel. Pressure vessel assemblies of this type can be used, for example, in motor vehicles or other mobile units in order to supply the latter with gaseous fuel. The objective is in particular increasingly to use installation spaces below passenger cells in motor vehicles for accommodating pressure vessel assemblies. It is typically required here for the homologation of the vehicle that a pole test is passed which simulates a side impact in that a pole impacts the vehicle from the side. The energy is typically absorbed by way of rocker panels which are of a correspondingly rigid basic design. An intrusion space which is available as a deformation region for the rocker panel in the event of a crash is additionally kept available.

The availability of intrusion spaces limits the extent of the pressure vessels and, as a result, the quantity of gaseous fuel stored.

Document DE 10 2019 202 895 A1 discloses a storage module having a plurality of tubular pressurized tanks which are disposed so as to be axially aligned between two mutually opposite receptacle plates, and on the axial ends of the tubular pressurized tanks are connected to the receptacle plates, wherein the pressurized tanks are rigidly fastened to one of the receptacle plates and fastened so as to be axially displaceable on the other receptacle plate.

It is a preferred object of the technology disclosed herein to minimize or remedy at least one disadvantage of a known solution, or to propose an alternative solution. It is in particular a preferred object of the technology disclosed herein to provide a pressure vessel assembly with a better utilization of space. Further preferred objects can be derived from the advantageous effects of the technology disclosed herein. The objects are achieved by the subject matter of the independent patent claims. The dependent claims represent preferred design embodiments.

The technology disclosed herein relates to a pressure vessel assembly comprising (i) a plurality of pressure vessels which are disposed so as to be mutually parallel; (ii) one or a plurality of fixed bearings; and (iii) one or a plurality of floating bearings, wherein each pressure vessel at one longitudinal end is fastened to a fixed bearing, and at an opposite longitudinal end is fastened to a floating bearing, so that the floating bearings define an initial intrusion space and a dynamic intrusion space opposite the floating bearings is defined by displacing the pressure vessels along the floating bearings.

Installation space is preferably saved by means of such a pressure vessel assembly. Intrusion spaces no longer have to be available on both sides, but it is sufficient for an initial intrusion space to be defined on one side, in particular on the side of the floating bearings, which initial intrusion space is automatically displaced to the other side in the event of a side impact. As a result, the pressure vessels can gain additional length, and the entire installation space which has to be included as an intrusion space in the design is reduced. Nevertheless, the same safety requirements can be met.

A fixed bearing is understood to be in particular a bearing by means of which one longitudinal end of a pressure vessel is fixedly connected to a body of the motor vehicle. A floating bearing may be understood to be in particular a bearing which indeed fixes one longitudinal end of the pressure vessel but permits the longitudinal end to be displaced relative to the body, typically in one direction, in particular a straight line. In this way, a defined movement of the longitudinal end fixed to such a floating bearing without creating non-defined states or compromising the stability of the system can be permitted by means of the floating bearing.

An intrusion space is understood to be in particular an installation space which is available for the bending of a rocker panel in the event of a side impact. This is thus a space which can be occupied by the rocker panel without damaging the pressure vessels in the event of a side impact. In embodiments according to the prior art, such an intrusion space is typically present on both sides. In the embodiment described herein, the intrusion space is initially present on one side and as a dynamic intrusion space is displaced to the other side when required. In other words, on a side on which no initial intrusion space is configured, a bending rocker panel does not damage the pressure vessels as would potentially be the case with a rigid fastening but only displaces the pressure vessels, and therefore creates its own intrusion space.

The floating bearings preferably enable a displaceability of at least 10 mm or at least 20 mm. Values of this type have proven successful for typical applications. In particular, the floating bearings can permit a displaceability of at least 20 mm, at least 50 mm or at least 100 mm, and/or at most 50 mm, at most 100 mm or at most 150 mm. In typical vehicles, this enables a sufficient tolerance in relation to side impact events, and simultaneously enables a greater length of the pressure vessels and thus more gaseous fuel to be stored in comparison to known embodiments.

The floating bearings can in particular enable a displaceability along or parallel to the longitudinal direction of the pressure vessels. The longitudinal directions can in particular be mutually parallel. Such a displaceability enables an advantageous displacement of the pressure vessels along the longitudinal direction thereof in the event of a side impact, such that the pressure vessels can be displaced to the other side in a motor vehicle, for example. The pressure vessels can in particular be installed transversely in the motor vehicle.

According to one embodiment, only one pressure vessel is fastened to each fixed bearing. In other words, in such an embodiment each pressure vessel is assigned a dedicated fixed bearing.

According to one embodiment, the pressure vessels are assigned to a plurality of groups, wherein the pressure vessels of each group are conjointly fastened to one or a plurality of fixed bearings. In other words, the pressure vessels are divided into a plurality of groups, and the pressure vessels of each group are in each case conjointly fastened to one or a plurality of fixed bearings. As a result, pressure vessels can also be mutually stabilized on the side of the fixed bearings. In particular, the groups cannot overlap so that each pressure vessel is expediently assigned to exactly one group, and only those pressure vessels that belong to a respective group are conjointly fastened.

According to one embodiment, the floating bearings, when viewed in a direction transverse to the longitudinal direction of the pressure vessels, are disposed so as to be offset between the pressure vessels. As a result, installation space, in particular also in a potential vertical direction, can ideally be saved.

However, other embodiments are also possible.

According to one embodiment, only one pressure vessel is fastened to each floating bearing.

According to one embodiment, the pressure vessels are assigned to a plurality of groups, wherein the pressure vessels of each group are conjointly fastened to one or a plurality of floating bearings. In other words, the pressure vessels are divided into a plurality of groups, and the pressure vessels of each group are in each case conjointly fastened to one or a plurality of floating bearings. As a result, pressure vessels can also be mutually stabilized on the side of the floating bearings. In particular, the groups cannot overlap so that each pressure vessel is expediently assigned to exactly one group, and only those pressure vessels that belong to a respective group are conjointly fastened. This may in particular be the same group allocation as described above with reference to the fixed bearings. However, a different allocation of groups of pressure vessels can also be performed on the side of the floating bearings.

Each group can in particular comprise two, three, or more pressure vessels. This applies to the side of the floating bearings and to the side of the fixed bearings.

According to one embodiment, one, some, or all fixed bearings is/are in each case rigidly connected to at least one floating bearing. This applies in particular to that part of the floating bearing that otherwise would, or at least could, be also connected to a body. In this way, fixed bearings and floating bearings can be mutually stabilized. For example, such a connection can be established by a connecting web which is provided for this purpose and can be present in addition to the body. The connection described here is in particular a connection which is present in addition to the fact that floating bearings as well as fixed bearings are typically connected to the body anyway.

The technology disclosed herein furthermore relates to a motor vehicle comprising (i) a body, and (ii) at least one pressure vessel assembly as described herein, which is installed in the body. In terms of the pressure vessel assembly, reference may be made to all embodiments. In such a motor vehicle, pressure vessels can in particular be used that are longer than in the prior art, so that a larger volume is possible.

The pressure vessels of the pressure vessel assembly can in particular be aligned transversely to a longitudinal direction of the motor vehicle. A longitudinal direction of the motor vehicle is in particular a direction in which the motor vehicle travels when the steered wheels of the latter point straight ahead. The transverse direction is in particular horizontal and transverse to the longitudinal direction. The pressure vessels, or the longitudinal axes thereof, respectively, typically extend along this transverse direction. However, other embodiments are also possible here.

The pressure vessels can in particular be asymmetrically disposed along a transverse direction of the motor vehicle, so that the initial intrusion space is configured on one side of an installation space, and the fixed bearings are contiguous to the other side of the installation space. In this way, the best possible utilization of the existing installation space is enabled, wherein the initial intrusion space is available in the event of a side impact on the side of the initial intrusion space without the pressure vessels being displaced, and the pressure vessels are displaced such that the initial intrusion space is converted to the dynamic intrusion space on the other side and is likewise available in the event of a side impact from the other side. In this way, no intrusion space is preferably configured initially on the side of the fixed bearings. The installation space can in particular be defined between two rocker panels.

According to one embodiment, a first rocker panel can be disposed laterally to the pressure vessels so as to be directly adjacent to the fixed bearings or at a spacing of at most 50 mm, 100 mm or 150 mm from the latter. According to one embodiment, a second rocker panel can be disposed laterally to the pressure vessel assembly so as to be directly adjacent to the floating bearings or at a spacing of at most 50 mm, 100 mm or 150 mm from the latter. A directly adjacent embodiment can be understood to mean in particular that there is no longer any technically relevant spacing between a respective bearing and the rocker panel. A spacing of up to 150 mm can be provided for component tolerances or thermal deformations, for example. Such dimensions enable the installation space to be utilized in the best possible way.

The pressure vessel assembly can be used particularly for a motor vehicle (for example passenger motor vehicles, motorcycles, commercial vehicles). The pressure vessel assembly serves for storing fuel which is gaseous at ambient conditions. The pressure vessel assembly can be used, for example, in a motor vehicle which is operated with compressed natural gas (CNG) or liquefied natural gas (LNG) or with hydrogen. The pressure vessel assembly is typically fluidically connected to at least one energy converter which is specified to convert the chemical energy of the fuel into other forms of energy. This can be, in particular, a gas-operated internal combustion engine, or a fuel cell.

The pressure vessels can be embodied, for example, as composite overwrapped pressure vessels. The pressure vessels can be embodied, for example, as cryogenic pressure vessels or as high-pressure gas tanks. High-pressure gas tanks are configured to permanently store fuel at a nominal working pressure (NWP) of at least 350 bar over atmospheric pressure or at least 700 bar over atmospheric pressure at ambient temperatures. A cryogenic pressure vessel is suitable for storing the fuel at the aforementioned working pressures also at temperatures that are significantly (e.g., more than 50 K or more than 100 K) below the operating temperature of the motor vehicle.

The pressure vessels of the pressure vessel assembly can in particular be combined and conjointly with supporting, fastening and/or protecting elements (for example, protective shields, guards, barrier layers, covers, coatings, wrappings, etc.) form a permanently connected unit which may in particular be able to be assembled in the underfloor region below the passenger cabin. The longitudinal axes of the pressure vessels in the installed position can run so as to be mutually parallel, and/or individual pressure vessels can in each case have a length-to-diameter ratio with a value between 4 and 200, preferably between 5 and 100, and particularly preferably between 6 and 50.

In other words, an intrusion space typically cannot be utilized for integrating stiff components. In known embodiments, this intrusion space is typically available on both sides so as to take into account side impact events from both sides. However, this limits the installation space that can be utilized for integrating pressure vessels, and thus also the stored quantity.

Since the side impact typically takes place only from one side, the intrusion space can in particular be provided as a deformation space only on one side. As a result, the intrusion space can be reduced by, for example, approximately 50% in that an intrusion space for the event of a crash is kept available only on one side. The freed up installation space can additionally be used for storing gaseous fuel by correspondingly increasing the length of the pressure vessels.

The idea described herein provides a fastening concept for the pressure vessels disposed transversely on the vehicle, which enables that the chosen intrusion space is completely utilized in the event of a side impact, independently of the side on which the crash takes place, and the pressure vessels are not imparted any compressive load in the longitudinal direction of the vessels. For this purpose, a fixed/floating mounting is to be expediently chosen for the fastening concept. The floating bearing here enables at least as much travel of movement in the longitudinal direction of the pressure vessels as there is intrusion space available in the same direction. In the regular operation of the vehicle, the floating bearing side also enables the pressure vessel to be fastened without tension, the pressure vessel being subjected to minor expansions as a result of filling and retrieving.

If a side impact arises on the side of the floating bearing, an intrusion space is available and the pressure vessels are not displaced on account of the impact. If a side impact arises on the side of the fixed bearing, the affected pressure vessels are displaced in the longitudinal direction of the pressure vessels by the fixed bearing and guided by the floating bearing.

The floating bearing can be embodied as a friction bearing or as a roller support bearing. Corresponding axial guiding can be provided for this purpose. For example, a guide rail can be provided.

For an optimized utilization of the installation space, and so that the pressure vessels disposed in parallel can lie directly next to one another, the guide rail can lie between the pressure vessels. The geometry of the profile in which the guide rail is integrated can be trapezoid. In the lateral view, trapezoidal profiles can be situated between the pressure vessels. As a result, it can be avoided at least in certain embodiments that the displacement of the pressure vessels in the longitudinal direction of the vessels in the event of a crash is blocked by the trapezoidal profile.

A guide rail can be embodied as a type of T-groove, for example. This is expedient for guiding sliding blocks in a mounting by a friction bearing, for example, as well as for guiding roller support bearings. The guide rail here can be attached to the upper side and/or the lower side. There is also the possibility of combining a plurality of vessels so as to form a module, and of conjointly guiding the vessels.

When a trapezoidal profile in which the guide rail is integrated on the side of the floating bearings continues across the entire vehicle width, this results in a stiffness in the event of a crash.

In the case of a continuous trapezoidal profile it is likewise expedient for the T-groove guide rail to be continued. This offers additional possibilities for a fastening concept on the side of the fixed bearings, and increases the stiffness in comparison to a hollow trapezoidal profile.

The technology disclosed herein will now be described by means of the figures.

DETAILED DESCRIPTION OF THE DRAWINGS

Figure 1:
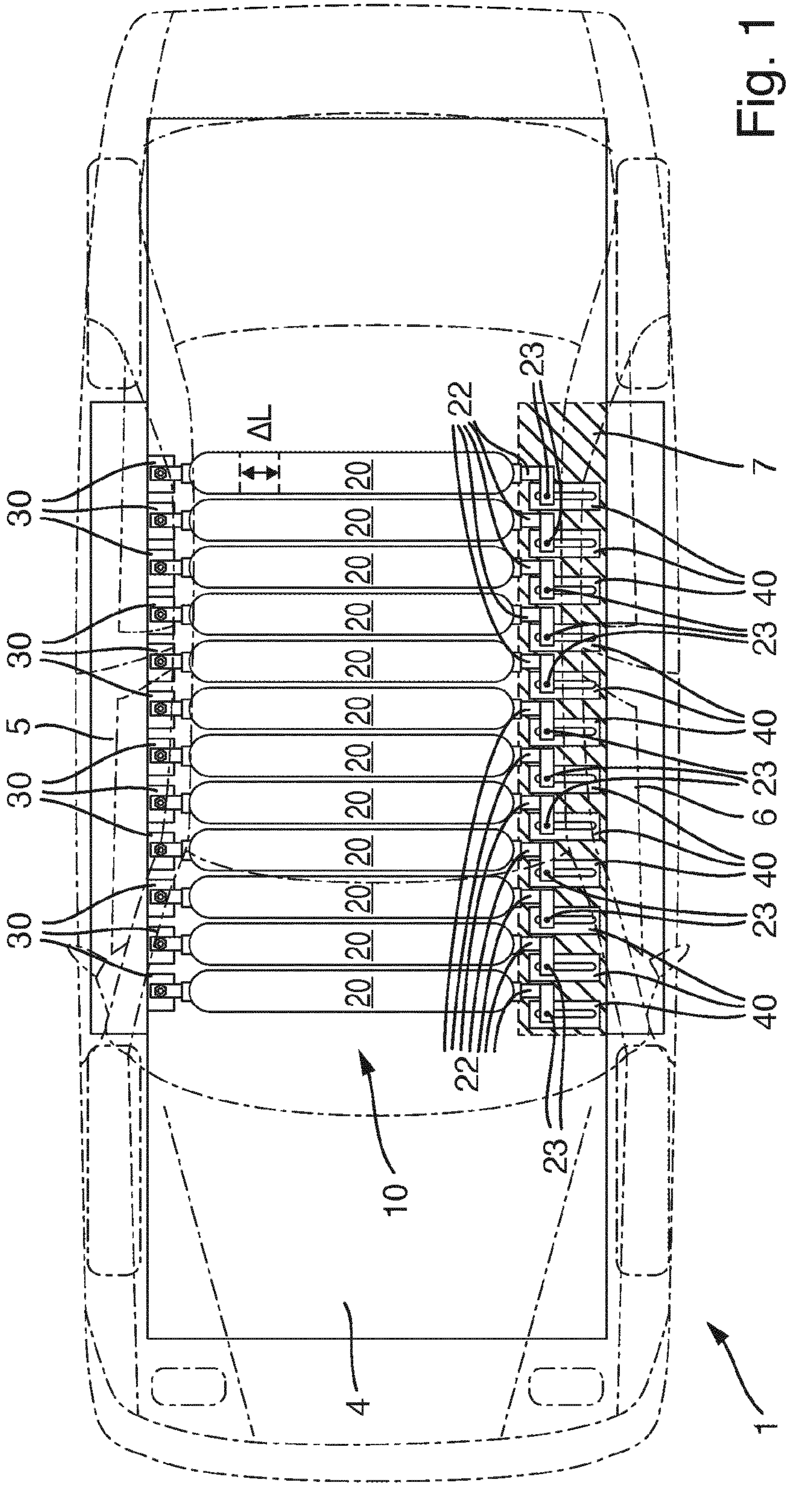
FIG. 1 shows a motor vehicle.

FIG. 1 shows, purely schematically, a motor vehicle 1 according to one exemplary embodiment. The motor vehicle 1 has four wheels which are purely schematically illustrated and enable a movement of the motor vehicle 1 along a longitudinal direction. The motor vehicle 1 has a body 4 to which further components are attached.

Disposed laterally on the motor vehicle 1 are a first rocker panel 5 and a second rocker panel 6. A pressure vessel assembly 10 is disposed between the two rocker panels 5, 6. The pressure vessel assembly 10 has a plurality of pressure vessels 20 which extend along a transverse direction of the motor vehicle 1.

On one side, the pressure vessels 20 at respective longitudinal ends are fastened in fixed bearings 30. The latter establish a connection to the body 4. The fixed bearings 30 here are embodied as shown, so as to be directly contiguous to the first rocker panel 5.

On the opposite side, longitudinal ends of the pressure vessels 20 are fastened to floating bearings 40. The floating bearings 40 are embodied so as to be directly contiguous to the second rocker panel 6. Each pressure vessel 20 here is connected to an angle 22 which in turn is connected to the floating bearing 40 by way of a vertical pin 23.

The floating bearings 40 fix the pressure vessels 20 by way of a degree of freedom, specifically a movement along the transverse direction of the motor vehicle 1. In the event of a corresponding movement of the fixed bearings 30, the floating bearings 40 thus enable the pressure vessels 20 to be displaced in the transverse direction toward the second rocker panel 6.

In the state illustrated in FIG. 1, an initial intrusion space 7 is available between the second rocker panel 6 and the pressure vessels 20, in which intrusion space 7 the second rocker panel 6 can bend in the event of a side impact without one of the pressure vessels 20 being contacted or damaged. The initial intrusion space 7 is shown as a hatched area. In this way, the safety in the event of a side impact can be advantageously increased. However, if the side impact event were to take place from the other side, the first rocker panel 5 would be bent inward and in the process displace the fixed bearings 30 transversely toward the second rocker panel 6. By virtue of being mounted in the floating bearings 40, the pressure vessels 20 can readily conjointly perform this movement so that the initial intrusion space 7 is converted into a dynamic intrusion space on the opposite side of the pressure vessels 20, which dynamic intrusion space is actually available to the first rocker panel 5 for bending, without any of the pressure vessels 20 being contacted or damaged.

As a result of this embodiment, the length of the pressure vessels 20 can be increased in comparison to known embodiments in which intrusion spaces have to be kept available on both sides. In FIG. 1, this length is plotted as the length difference ΔL. As a result, the quantity of gaseous fuel to be carried on board can be increased.

Figure 2:
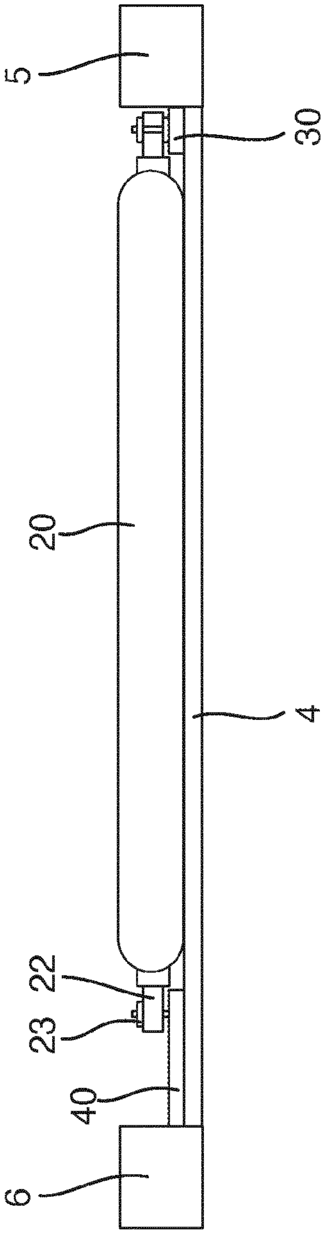
FIG. 2 shows a cross section through the motor vehicle.

FIG. 2 shows a lateral detailed view of components of the motor vehicle from FIG. 1. It can be seen here that the fixed bearing 30 produces a direct connection between the pressure vessels 20 and the body 4. To be seen on the opposite side are the angle 22 in a lateral view and the pin 23. As is shown, the pin 23 produces a connection to the floating bearing 40 which in turn is fastened on the body 4. The space between the angle 22 and the second rocker panel 6 is available for displacement, as shown.

Figure 3:
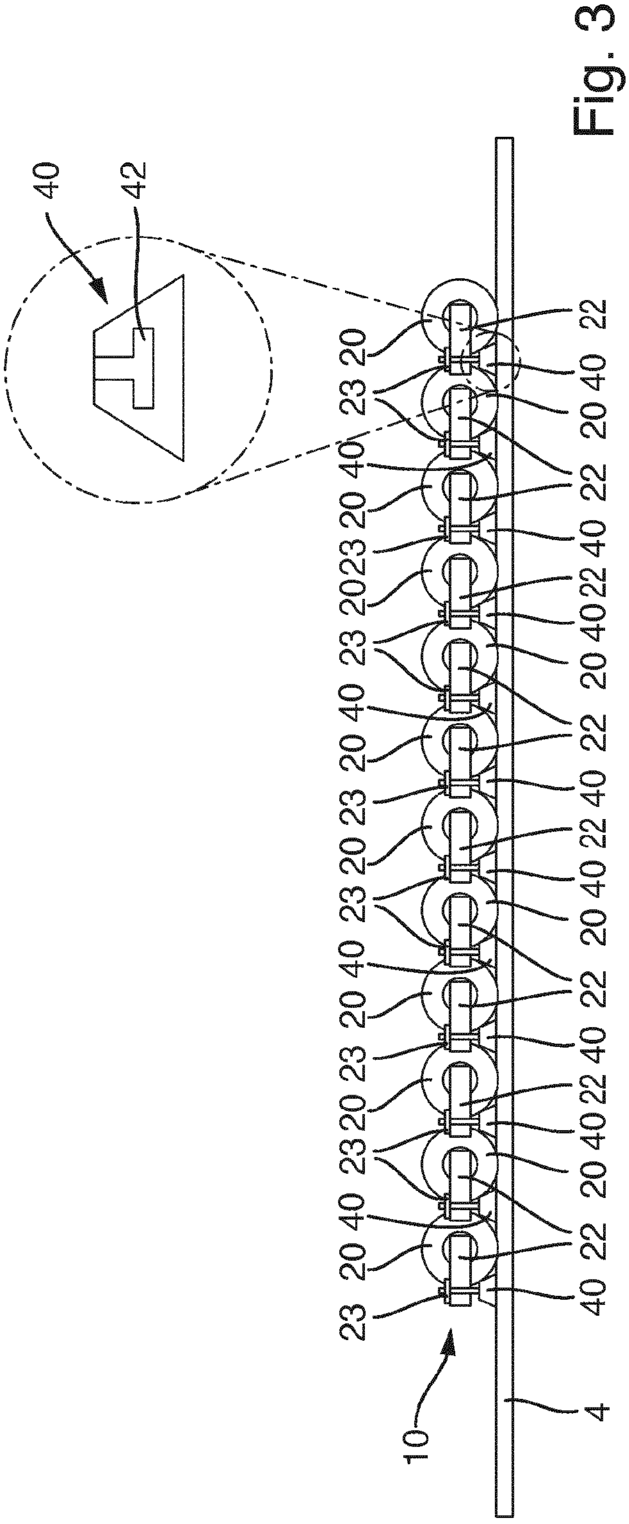
FIG. 3 shows a lateral view of the motor vehicle.

FIG. 3 shows a lateral view of the pressure vessel assembly 10 on the body 4. The disposal of the floating bearings 40 can be seen even more clearly here. These floating bearings 40 are situated between two respective directly adjacent pressure vessels 20. The pins 23 engage from above in a respective floating bearing 40. As a result of such an embodiment, the installation space can be ideally utilized and the floating bearings 40 do not impede any movement of the pressure vessels 20. As is shown here, the floating bearings 40 bear directly on the body 4. Each floating bearing 40 in the embodiment shown has a T-shaped groove 42 which is illustrated in a detailed view in FIG. 3. The pin 23 can engage from above in this T-shaped groove 42, thus ensuring reliable guiding of the respective pressure vessel 20. It can in particular also be prevented as a result that the pressure vessel 20 is lifted upward.

Figure 4:
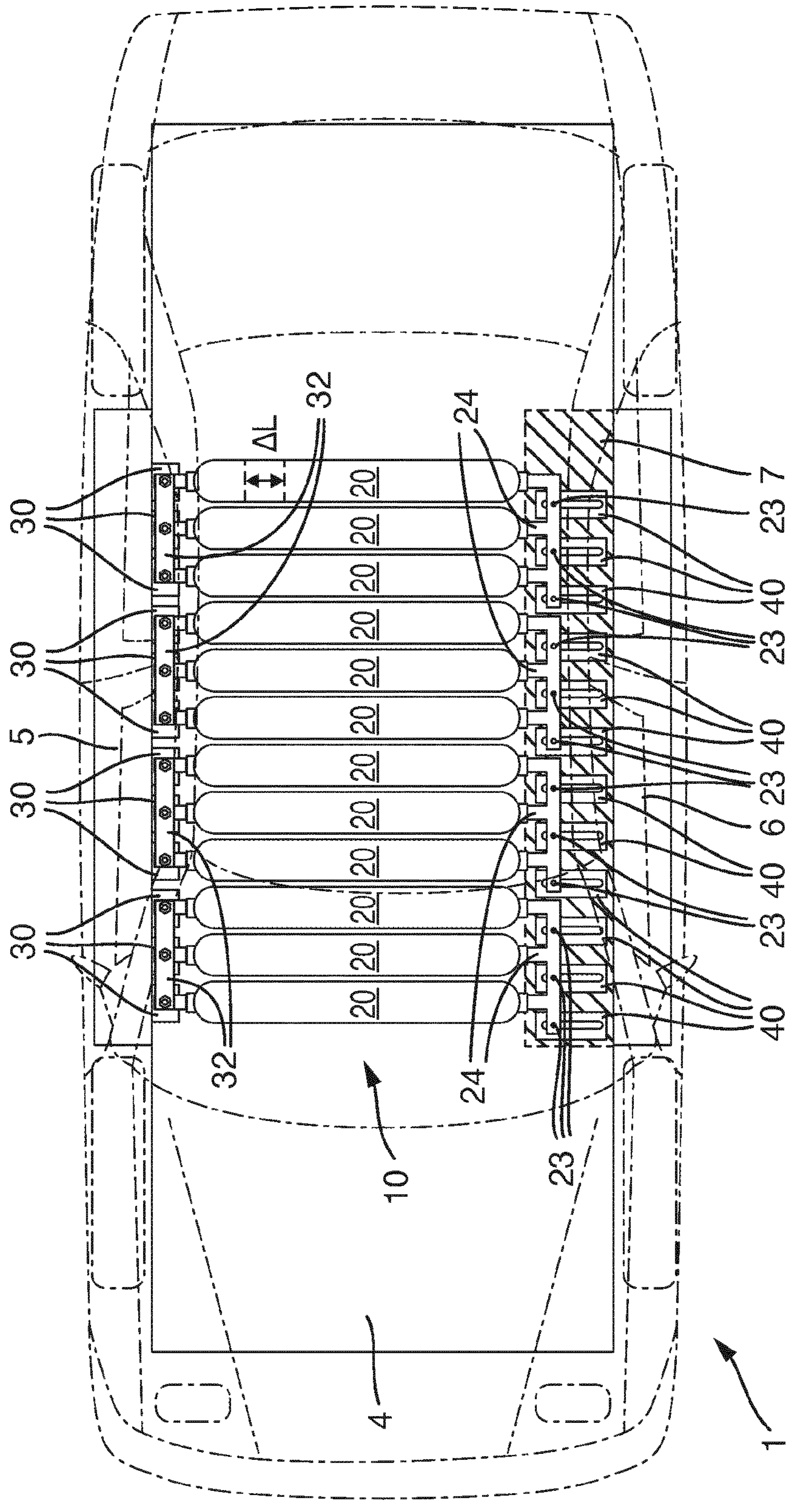
FIG. 4 shows an alternative embodiment of a motor vehicle.

FIG. 4 shows a motor vehicle 1 according to an alternative embodiment. As opposed to the embodiment already described, three pressure vessels 20 here are in each case combined so as to form one group. Each group of pressure vessels 20 on the side of the fixed bearings has a connecting rail 32 which connects the pressure vessels 20 to one another. The stability can be further increased as a result. Furthermore, each group of pressure vessels 20 also has a respective connecting element 24 on the side of the floating bearings, which connecting element 24 connects the pressure vessels 20 of the group to one another on the side of the floating bearings. The stability is further increased also as a result thereof, because three pressure vessels 20 are in each case rigidly connected to one another. The functionality of the dynamically available intrusion space is nevertheless maintained. The connecting element 24 assumes the function of the angles 22 in the embodiment of FIG. 1.

Figure 5:
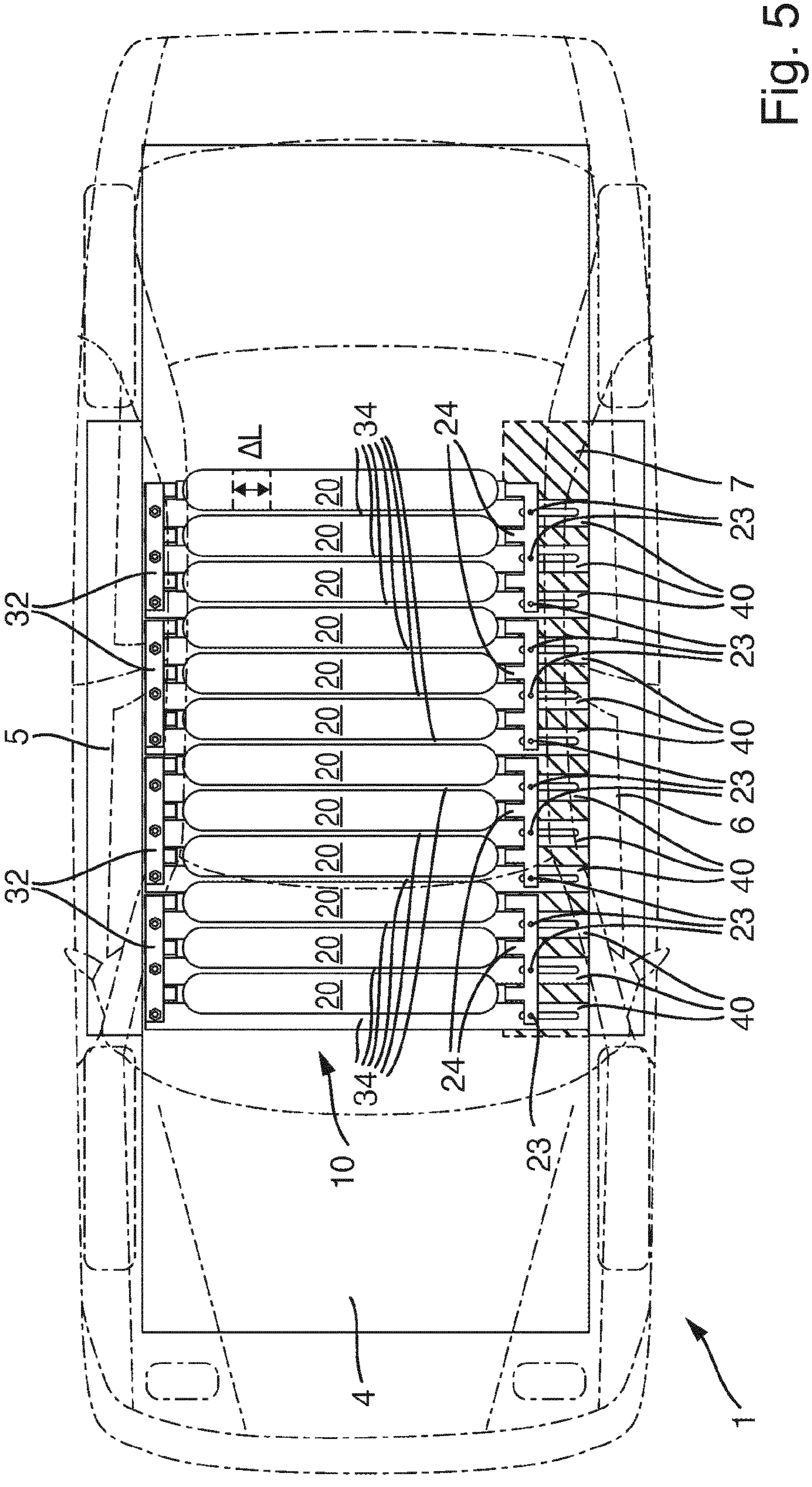
FIG. 5 shows another alternative embodiment of a motor vehicle.

FIG. 5 shows another alternative embodiment of a motor vehicle 1. In addition to the embodiment of FIG. 4, the fixed bearings 30 and the floating bearings 40 here are additionally connected to one another by connecting webs 34. As a result, the stability of the overall system is increased, this making it possible that the functionality described is even better ensured, particularly in the event of severe side impacts.

Overall, intrusion space can advantageously be saved without sacrificing safety as a result of the embodiment described herein. The stored fuel supply can be increased as a result.

For the sake of legibility, the term "at least one" has at times been omitted for simplification. If a feature of the technology disclosed herein is described in the singular, or by an indefinite article (e.g., the/a pressure vessel, the/a floating bearing, etc.) the plural thereof is intended to be simultaneously included in the disclosure (e.g., the at least one pressure vessel, the at least one floating bearing, etc.).

The description of the present invention given above serves only for illustrative purposes and not for the purposes of limiting the invention. Various changes and modifications are possible within the context of the invention without departing from the scope of the invention and its equivalents.

LIST OF REFERENCE CHARACTERS

1 Motor vehicle
4 Body
5, 6 Rocker panels
7 Intrusion space
10 Pressure vessel assembly
20 Pressure vessel
22 Angle
23 Pin
24 Connecting element
30 Fixed bearing
32 Connecting rail
34 Connecting webs
40 Floating bearing
42 Groove

The invention claimed is:

1. A pressure vessel assembly, comprising a plurality of mutually parallel pressure vessels, each with a longitudinal axis;

one or a plurality of fixed bearings; and one or a plurality of floating bearings, wherein each pressure vessel at one longitudinal end is fastened to a fixed bearing and at an opposite longitudinal end is fastened to a floating bearing, wherein the floating bearings define an initial intrusion space such that, by displacing the pressure vessels along the floating bearings, a dynamic intrusion space at the one longitudinal end is defined, and wherein the floating bearings each comprise a vertical pin received by a T-shaped groove extending longitudinally parallel to and offset between the pressure vessels.

2. The pressure vessel assembly according to claim 1, wherein the floating bearings enable a displaceability of at least 10 mm or at least 20 mm.

3. The pressure vessel assembly according to claim 1, wherein the floating bearings enable a displaceability of at most 150 mm.

4. The pressure vessel assembly according to claim 1, wherein the floating bearings enable a displaceability along or parallel to a longitudinal direction of the pressure vessels.

5. The pressure vessel assembly according to claim 1, wherein only one pressure vessel is fastened to each fixed bearing.

6. The pressure vessel assembly according to claim 1, wherein the pressure vessels are assigned to a plurality of groups and wherein pressure vessels of each group are conjointly fastened to one or a plurality of fixed bearings.

7. The pressure vessel assembly according to claim 1, wherein only one pressure vessel is fastened to each floating bearing.

8. The pressure vessel assembly according to claim 1, wherein the pressure vessels are assigned to a plurality of groups and wherein pressure vessels of each group are conjointly fastened to one or a plurality of floating bearings.

9. The pressure vessel assembly according to claim 1, wherein one, some, or all fixed bearings is/are rigidly connected to at least one floating bearing.

10. The pressure vessel assembly according to claim 1, wherein the floating bearings are configured as friction bearings having a guide rail or as roller support bearings having a guide rail.

11. A motor vehicle, comprising:

a body; and at least one pressure vessel assembly according to claim 1 which is installed in the body.

12. The motor vehicle according to claim 11, wherein the pressure vessels of the pressure vessel assembly are aligned transversely to a longitudinal direction of the motor vehicle.

13. The motor vehicle according to claim 12, wherein the pressure vessels are asymmetrically disposed along a transverse direction of the motor vehicle such that the initial intrusion space is configured on one side of an installation space and the fixed bearings are contiguous to the other side of the installation space.

14. The motor vehicle according to claim 11:

wherein a first rocker panel is disposed laterally to the pressure vessel assembly so as to be directly adjacent to the fixed bearings or at a spacing of at most 150 mm from the fixed bearings; and/or wherein a second rocker panel is disposed laterally to the pressure vessel assembly so as to be directly adjacent to the floating bearings or at a spacing of at most 150 mm from the floating bearings.

* * * * *